INVENTORS
ARNOLD M. SPIELBERG
& IVAN H. SUBLETTE
BY Morris A. Rabkin
ATTORNEY

INVENTORS
ARNOLD M. SPIELBERG
& IVAN H. SUBLETTE
BY Morris Robin
ATTORNEY

INVENTORS
ARNOLD M. SPIELBERG
& IVAN H. SUBLETTE
BY Morris B. Rabkin
ATTORNEY 2,798,667

CODE CONVERTER SYSTEM

Arnold M. Spielberg and Ivan H. Sublette, Haddonfield, N. J., assignors to Radio Corporation of America, a corporation of Delaware Application February 18, 1953, Serial No. 337,572
11 Claims. (Cl. 235—61)

This invention relates to electronic code converter apparatus, and more particularly to electronic circuitry for converting a set of signals representative of a number in a binary code to a second set of signals representative of the nines complement of that number in the same binary code.

In electronic digital computers, one method of performing the arithmetic operation of subtraction, using a binary system, is the nines-complement method, in which subtraction is performed by adding. The nines complement of a number is the difference between the number and nine; thus, the nines complement of 2 is 7. Subtraction is performed by adding the nines complement of the subtrahend to the minuend, with a simple correction. For example, to subtract 2 from 8, the nines complement of 2, which is 7, is added to 8 giving the sum of 15. The correction consists of adding 1, giving the sum of 16; and then discarding the carry, or tens digit, which results in the correct difference of 6. The correction of discarding the carry digit and adding 1, is sometimes called "end-around-carry."

The same method of subtraction by adding may be performed in the binary number system. In the ordinary binary system, the digit positions of a five-digit number represent the powers of 2, $2^0$ through $2^4$. To subtract 0010 from 1000 (2 from 8), 0111 is added to 1000 and the sum corrected by adding 1 giving the sum of 10000. The correction may be completed by any equivalent of discarding the decimal carry; say, by subtracting the decimal number 10, which may be done by adding 0110 (6) and discarding the $2^4$ digit (16) to give the proper difference 0110. The tens-discard correction may also be performed by converting the corrected binary sum to the binary-coded-decimal number system and discarding the tens digit. In the binary-coded-decimal system, numbers from 0 through 9 are represented by the usual four-digit binary numbers preceded by a fifth digit 0; and numbers from 10 through 19 are represented by the same four-digit binary numbers preceded by a fifth digit 1. This number system is, therefore, a combination of the binary and decimal systems with the fifth digit representing the tens-place digit. The binary-coded-decimal number system and apparatus for converting a binary number to a binary-coded-decimal number is described in a copending patent application of Ivan Sublette, Serial No. 307,253, filed August 30, 1952.

When a digital computer is based on the binary-coded-decimal system, many of its operations are decimal in character. As a result, the use of the nines complement of a number may frequently occur in the various computer operations. For example, in working with or in storing negative numbers, it may be preferable to first convert the numbers to their nines complements.

The obvious method of taking the nines complement of a binary number is by subtracting the number from the binary number nine. However, that entails the very operations, borrowing and the like, which may be avoided by the use of nines complements. Furthermore, as discussed below, it may also be desirable to convert certain special coded symbols, such as a space symbol, to certain ones of the binary nines complements. This could not be done by the ordinary subtraction operations.

Accordingly, it is an object of this invention to provide simple circuitry for converting binary numbers as well as special code symbols to the binary nines-complement numbers.

Another object of this invention is to provide reliable code apparatus for converting binary numbers to their nines complements that can operate at a high rate of speed.

Still another object of this invention is to provide a code converter system of the type described that is relatively inexpensive and whose construction, operation and maintenance is relatively simple.

A feature of this invention is the use of logical gating circuits for performing the nines-complement conversion.

These and other objects of this invention are achieved by providing separate means for generating phase and paraphase voltages in response to signals representing the binary number. The phase and paraphase voltages are applied in different combinations by a distribution network to gating circuits, made up of an arrangement of coincidence and buffer gates. The output signals produced by the gating circuits represent the nines complement of the original binary number.

The novel features of this invention both as to its organization and method of operation may be best understood from the following description when read together with the accompanying drawings in which.

Figure 1:
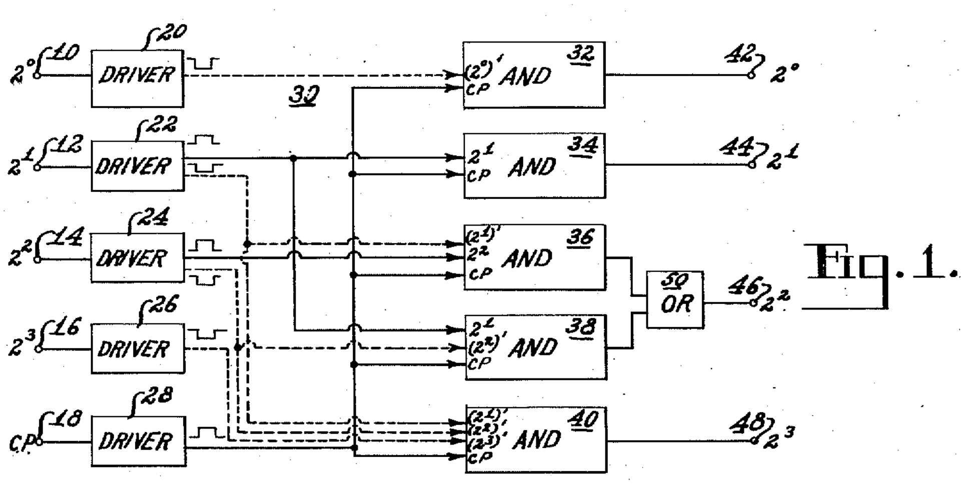
Figure 1 is a block diagram of a system for converting a binary number to its nines complement in accordance with this invention.

In Figure 1, a block diagram of a nines-complement converter embodying this invention is shown. There are four input terminals or channels 10–16 for receiving the signals representing a four-digit binary number. These are the usual digit positions representing $2^0$ through $2^3$. A fifth input terminal 18 receives clock pulses. Each of the input terminals is connected to a separate driver circuit 20–28 which amplifies the signal and also produces phase and paraphase voltages as outputs. The phase voltage outputs are shown in Figure 1 as full lines and the paraphase voltage outputs are shown as broken lines. The first driver circuit 20 receiving the signal representing $2^0$ produces a paraphase voltage in response to such a signal. The second driver circuit 22 receiving the $2^1$ signal produces both phase and paraphase voltages. The third driver circuit 24 receiving the $2^2$ signal produces both phase and paraphase voltage outputs and the fourth driver circuit 26 receiving the $2^3$ signal produces a paraphase voltage output. The clock pulse driver circuit 28 produces a phase voltage output.

These phase and paraphase voltages are applied, by means of a distribution network 30, to five "and" circuits 32–40 in different combinations to be discussed below. An "and" circuit or gate is a gating system having a plurality of input terminals and a single output terminal. An "and" gate, sometimes called a coincidence gate, functions to pass an impulse only when all of the inputs are energized simultaneously. The term "coincidence gate" stems from the function of passing a signal only upon the coincidence of signals on all its input channels.

The first, second and fifth "and" gates 32, 34, 40 have their outputs connected to separate output terminals 42, 44, 48 representing respectively the nines-complement binary digits $2^0$, $2^1$, and $2^3$. The third and fourth "and" gates 36, 38 are connected through an "or" gate 50 to another output terminal 46 representing the binary digit $2^2$. An "or" gate is a logical gating arrangement for two or more inputs and a single output. An "or" gate operates to produce an output signal if a signal is applied to any one of its inputs.

In Table I, there is shown a list of the four-digit binary numbers representing the decimal digits from 0 to 9 and also the corresponding nines complements of those binary numbers.

*Table I*

| Decimal Digit | Binary Digital Input | | | | Decimal Complement | Output, Nines Complementor | | | |
|---|---|---|---|---|---|---|---|---|---|
| | $2^3$ | $2^2$ | $2^1$ | $2^0$ | | $2^3$ | $2^2$ | $2^1$ | $2^0$ |
| 0 | 0 | 0 | 0 | 0 | 9 | 1 | 0 | 0 | 1 |
| 1 | 0 | 0 | 0 | 1 | 8 | 1 | 0 | 0 | 0 |
| 2 | 0 | 0 | 1 | 0 | 7 | 0 | 1 | 1 | 1 |
| 3 | 0 | 0 | 1 | 1 | 6 | 0 | 1 | 1 | 0 |
| 4 | 0 | 1 | 0 | 0 | 5 | 0 | 1 | 0 | 1 |
| 5 | 0 | 1 | 0 | 1 | 4 | 0 | 1 | 0 | 0 |
| 6 | 0 | 1 | 1 | 0 | 3 | 0 | 0 | 1 | 1 |
| 7 | 0 | 1 | 1 | 1 | 2 | 0 | 0 | 1 | 0 |
| 8 | 1 | 0 | 0 | 0 | 1 | 0 | 0 | 0 | 1 |
| 9 | 1 | 0 | 0 | 1 | 0 | 0 | 0 | 0 | 0 |

The converter circuit of this invention performs the conversion shown in Table I; i. e. it converts any set of four signals representing a binary number to a set of output signals representative of the corresponding nines-complement of that number. The embodiment of this invention that is described uses the code system of a positive voltage to represent the binary digit "1," and the absence of such a voltage for the binary digit "0." The invention may also be adapted for other code systems.

The logical operations involved in the conversion are carried out by the gating circuits. The "and" circuits are arranged to be responsive to different combinations of the phase and paraphase voltages produced by the driver circuits. The distribution network connects the different combinations of driver-circuit outputs to the gating circuits so that each gating circuit may receive the associated combination of phase and paraphase voltages.

The combinations of voltages to which the different "and" circuits are responsive are shown in Figure 1 along the left side of each block. The symbol prime (′) represents the logical operation of negation. As discussed below, the paraphase voltages function as inhibit signals in the "and" circuits, so that a primed digit indicates that the absence of an inhibit or paraphase voltage corresponding to that digit is required. The unprimed digits indicate that the presence of phase voltages corresponding to those digits is required for the "and" circuit to produce an output signal. The clock pulses are not necessary to the conversion operation as such, but they permit efficient synchronization and eliminate spurious outputs, as discussed below.

The first "and" circuit 32 produces a $2^0$ output signal when there is a clock pulse and the absence of a paraphase voltage corresponding to a $2^0$ input signal. The second "and" circuit 34 produces a $2^1$ output signal when there is a clock pulse and a phase voltage corresponding to a $2^1$ input signal. The third "and" circuit 36 produces a signal on the $2^2$ output terminal 46 through the "or" circuit 50 when there is a clock pulse and the presence of a $2^2$ phase voltage and the absence of a $2^1$ paraphase voltage. The fourth "and" circuit 38 produces a signal on the $2^2$ output terminal 46 through the "or" circuit 50 when there is a clock pulse, a phase voltage corresponding to the $2^1$ input signal and the absence of a paraphase voltage corresponding to a $2^2$ input signal. The fifth "and" circuit 40 produces a signal on the $2^3$ output terminal 48 when there is a clock pulse and the absence of paraphase voltages corresponding to $2^3$, $2^2$, and $2^1$ input signals.

Figure 2:
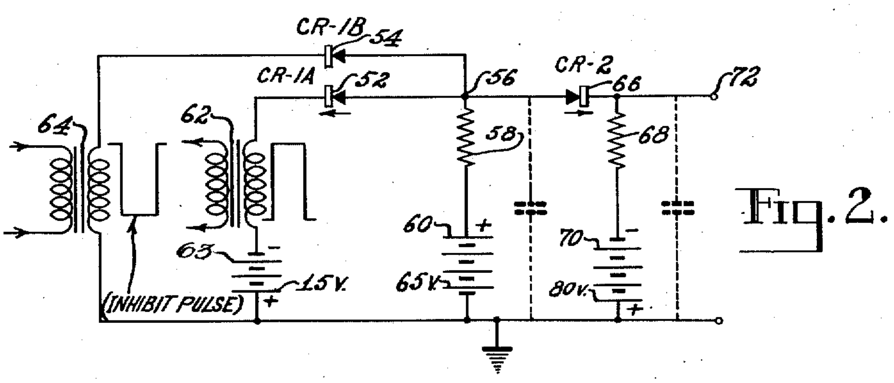
Figure 2 is a schematic circuit diagram of a basic gating circuit used in an embodiment of this invention and includes a coincidence gate and a portion of a buffer gate.
Figure 3:
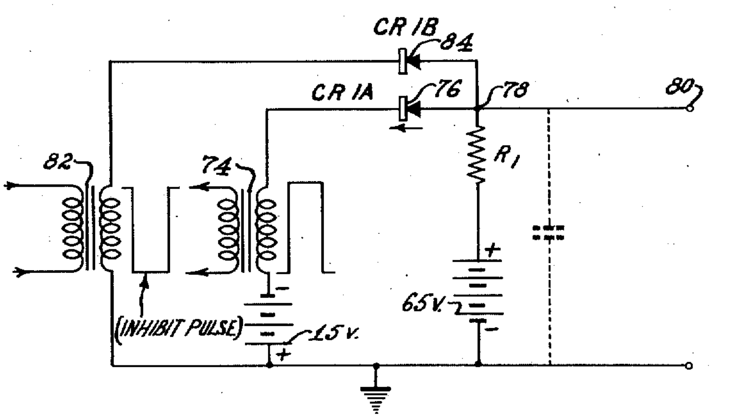
Figure 3 is a basic coincidence circuit used in an embodiment of this invention.

In Figures 2 and 3 there are shown circuit diagrams of basic gating circuits used for the block diagram of Figure 1. These circuits are shown and explained in the patent application to Ivan Sublette, cited above. The circuit in Figure 2 is made up of a coincidence circuit and a portion of a buffer circuit. The "and" gate is made up of a first and second diode 52, 54, the anodes of which are connected through a junction 56 and a common load resistor 58 to the positive side of a first source of potential 60. The cathode of the first diode 52 is connected through the secondary of a first driver transformer 62 to the negative side of a second source of potential 63. The cathode of the second diode 54 is connected through the secondary of a second driver transformer 64 to ground. The portion of an "or" gate includes a third diode 66 whose anode is connected to the junction 56 of the anodes of the "and" diodes 52, 54. The cathode of the "or" diode 66 is connected through a load resistor 68 to the negative side of a third source of potential 70 and also to an output terminal 72. Wiring capacitances are shown by broken lines connected from the anode of the "or" diode to ground and from the output terminal to ground.

For purposes of explanation, the voltages of the potential sources are shown in the circuit diagram. These are 65 volts for the first source 60, 15 volts for the second source 63 and 80 volts for the third source 70. Due to these potential levels, the first "and" diode 52 is conducting. Therefore, the junction point 56 at its anode is at −15 volts since the diode and transformer-secondary impedances are negligible. As a result, the "or" diode 66 is also conducting, and the output terminal 72 is also at −15 volts. The second diode 54 is not conducting since its anode is at −15 volts and its cathode is at ground. When the primary of the first transformer 62 is pulsed so that a positive or phase voltage is induced in the secondary, this rise in voltage is of sufficient amplitude to block conduction in the first "and" diode 52. As a result, the junction point 52 starts rising towards the potential of the first source 60. When it reaches ground potential, the second "and" diode 54 starts to conduct so that the junction point 56 is clamped to ground. As the junction point 56 rises to ground potential, the "or" diode 66 continues to conduct until the output terminal 72 is also at ground. With the termination of the pulse in the transformer secondary, the first diode 52 conducts and thus restores the junction point 56 to −15 volts. At this time, the anode of the "or" diode 66 is negative with respect to its cathode which is at ground potential, so that it stops conducting. Thus, the voltage at the output terminal 72 falls towards the level of the third potential source 70 until it reaches −15 volts when the "or" diode conducts again clamping the output terminal at this potential level. Thus, a pulse in the first transformer primary produces a corresponding pulse at the output terminal 72.

However, if the second transformer primary 64 is also pulsed, a negative or paraphase voltage is induced in the secondary. This inhibit pulse causes the second "and" diode 54 to conduct, and the amplitude of this inhibit pulse is such that the junction point does not rise significantly above its original level of −15 volts. As a result, there is no change in voltage from the original −15 volts level at the output terminal. This gating circuit, therefore, produces an output pulse if there is a pulse on the first transformer, but the output pulse is inhibited if there is also a pulse on the second transformer.

The clock pulse is used because the induced voltages in the secondaries of the first and second transformers do not rise instantaneously. To eliminate spurious outputs due to transients, each "and" circuit is gated out with a clock pulse that is delayed with respect to the leading edge of the input pulse and which has a duration less than that of the input pulse.

The "and" circuit shown in Figure 3 is similar to the circuit just described, except that it does not include a portion of an "or" circuit. The operation is substantially the same. When the first transformer 74 is pulsed, conduction through the first "and" diode 76 is cut off to produce a rise in voltage at the junction 78 of the diodes and, therefore, at the output terminal 80. However, if simultaneously the second transformer 82 is pulsed, there is a negative voltage at the cathode of the second diode 84 causing it to conduct, and the output pulse is inhibited.

These two gating circuits are used with modifications for the "and" and "or" circuits shown in block form in Fig. 1. Together with appropriate driver circuits, these gating circuits make up the schematic circuit diagram embodying this invention, shown in Figure 3. Each of the driver circuits 20—28 is made up of an amplifier tube 86 whose control grid is capacitor-coupled to the associated input terminal to receive positive input voltage signals, and also negatively biased to cut off potential. The anode of each amplifier 86 is connected through the primary of a transformer 88–96 to a source of operating potential. The secondaries of these transformers are connected to a negative bias source 64 or to ground accordingly as they are to produce phase or paraphase voltages respectively in the manner described with respect to the circuit of Figure 2. The clock pulse driver circuit has the secondary of its transformer 96 connected to produce a phase voltage as described above. Similarly, the secondaries of the transformers 88, 94 for the $2^0$ and $2^3$ driver circuits are arranged to produce paraphase voltages. The transformers 90, 92 for the $2^1$ and $2^2$ driver circuits have two secondaries which produce phase and paraphase voltages respectively. These voltages are applied to the "and" gates in the manner previously described. The first "and" gate 32 connected to the $2^0$ output is the same as the gate shown in Figure 3, and it requires the presence of a clock pulse and the absence of a $2^0$ paraphase voltage to produce an output pulse. The second gate 34 connected to the $2^1$ output requires the presence of a clock pulse and a $2^1$ phose voltage to block both normally-conducting diodes and produce an output. The third "and" gate circuit 36 connected through a part of the "or" 50 circuit to the $2^2$ output is of the same type as shown in Figure 2. However, there are three inputs and the presence of two phase voltages and the absence of a paraphase voltage is required to produce an output. Of the same type, is the fourth "and" gate 38 also connected through the "or" circuit 50 to the $2^2$ output terminal. The fifth "and" gate 40 has four inputs and is responsive to the presence of a clock pulse, and the absence of three inhibit pulses to produce an output on the $2^3$ output terminal.

The operation of this circuit may be best understood by considering an example; the conversion of 0010 (2) to 0111 (7). Accordingly, the $2^1$ input terminal 12 has a positive voltage pulse applied to it, and a positive pulse is also applied to the clock-pulse terminal 18. The other input terminals are unchanged. Thus, the $2^1$ and clock-pulse amplifier tubes are rendered conductive drawing current through the primaries of the second and fifth transformers 90, 96. A phase and a paraphase voltage pulse are produced in the secondaries of the second transformer 90, and a phase voltage pulse is produced in the secondary of the clock-pulse transformer 96. The first "and" circuit 32 produces a $2^0$ output since there is a clock pulse and the absence of a $2^0$ inhibit pulse. The second "and" circuit 34 produces a $2^1$ output since there is a clock pulse and the presence of a $2^1$ phase voltage pulse. The third "and" circuit 36 does not produce a pulse because of the $2^1$ inhibit as well as the absence of a $2^2$ phase pulse. The fourth "and" circuit 38 produces $2^2$ output through the "or" gate 50 since there is a clock pulse, the presence of a $2^1$ phase pulse, and the absence of a $2^2$ inhibit. The fifth "and" circuit 40 does not produce a pulse because of a $2^1$ inhibit pulse. Thus, the output is 0111, as required.

The nines-complement converter described thus far is a basic circuit for performing the conversion shown in Table I of ten four-digit binary numbers. It is sometimes necessary and desirable to convert other special code symbols to one of the nines-complement numbers. Such symbols as space (which may be used between characters made up of a plurality of digits), item separation (which may be used between items made up of a plurality of characters), and a minus sign may be actually used in the performance of various computer operations. Thus, as shown in Table II, it may be desirable for the code conversions of the item-separation and space symbols to be the same as a complemented nine, and the code conversion for the minus sign to be the same as a complemented zero. One place where this may be desirable is in the subtraction process described above.

*Table II*

| Decimal Digit | Binary Digital Input | | | | | Decimal Complement | Output, Nines Complementor | | | |
|---|---|---|---|---|---|---|---|---|---|---|
| | S | $2^3$ | $2^2$ | $2^1$ | $2^0$ | | $2^3$ | $2^2$ | $2^1$ | $2^0$ |
| 0 | 1 | 0 | 0 | 0 | 0 | 9 | 1 | 0 | 0 | 1 |
| 1 | 1 | 0 | 0 | 0 | 1 | 8 | 1 | 0 | 0 | 0 |
| 2 | 1 | 0 | 0 | 1 | 0 | 7 | 0 | 1 | 1 | 1 |
| 3 | 1 | 0 | 0 | 1 | 1 | 6 | 0 | 1 | 1 | 0 |
| 4 | 1 | 0 | 1 | 0 | 0 | 5 | 0 | 1 | 0 | 1 |
| 5 | 1 | 0 | 1 | 0 | 1 | 4 | 0 | 1 | 0 | 0 |
| 6 | 1 | 0 | 1 | 1 | 0 | 3 | 0 | 0 | 1 | 1 |
| 7 | 1 | 0 | 1 | 1 | 1 | 2 | 0 | 0 | 1 | 0 |
| 8 | 1 | 1 | 0 | 0 | 0 | 1 | 0 | 0 | 0 | 1 |
| 9 | 1 | 1 | 0 | 0 | 1 | 0 | 0 | 0 | 0 | 0 |
| Item Separation | 1 | 1 | 1 | 0 | 0 | 9 | 1 | 0 | 0 | 1 |
| Space | 0 | 0 | 0 | 0 | 1 | 9 | 1 | 0 | 0 | 1 |
| Minus | 0 | 1 | 0 | 0 | 1 | 0 | 0 | 0 | 0 | 0 |

It may also be noticed in Table II, that in the code system used, the binary number 0001 and the code symbol for space have the same last four digits. In order to distinguish between such duplication in the code, a fifth binary digit S is added. This fifth digit has the sole function of distinguishing between codes and does not have any number value. As can be seen from Table II, the ordinary four-digit numbers with a special-code fifth digit have to be nines-complemented to a four-digit number, and certain additional codes have to be complemented to certain ones of those four-digit numbers. A nines-complement converter for performing these operations receives a five-digit character and converts it to a four-digit character.

Figure 5:
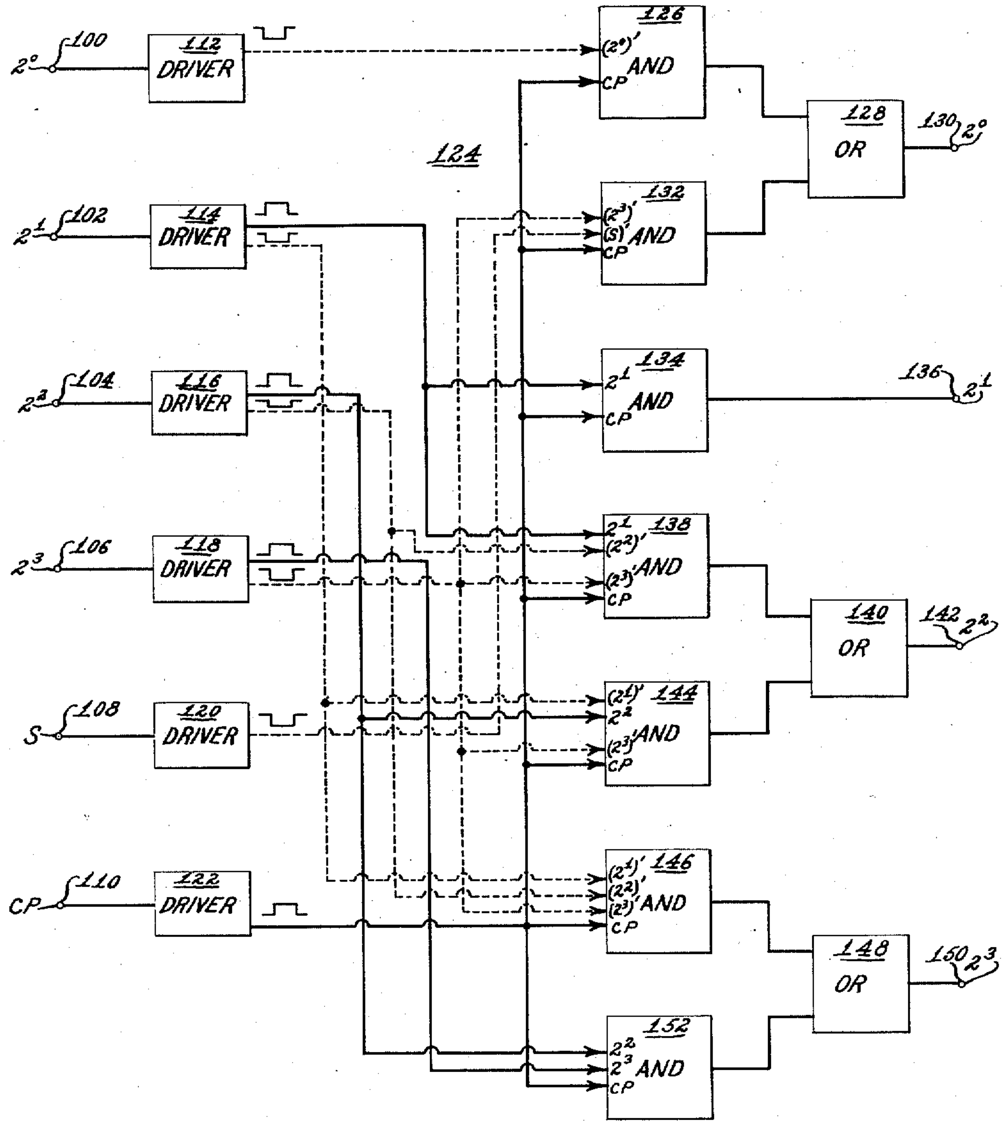
Figure 5 is a block diagram of another arrangement of gating circuits for producing the nines complement of a binary number in accordance with this invention.

The block diagram for performing this conversion is shown in Figure 5. This converter system has six input terminals 100–110. In addition to the four inputs 100–106 for the binary digits and the fifth input 110 for the clock pulse, there is a sixth input 108 for the fifth digit which is a special code distinguishing digit S. The driver circuits 112–122 for these inputs produce phase and paraphase voltages in a manner similar to the embodiment described above. The clock pulse driver 122 produces only a phase voltage, the $2^0$ and special-code drivers 112, 120 produce only paraphase voltages, and the other drivers produce both phase and paraphase voltages. These phase and paraphase voltages are applied in the proper combinations by a distribution network 124 to gating circuits made up of various arrangements of coincidence and buffer gates.

A first "and" gate 126 is responsive to a clock pulse, and the absence of a $2^0$ inhibit pulse to produce, through a first "or" circuit 128, a pulse on the $2^0$ output terminal 130. The second "and" gate 132 is responsive to a clock pulse and the absence of $2^3$ and S inhibit pulses to produce, through the first "or" circuit 128, a pulse on the $2^0$ output terminal 130. The third "and" gate 134 is responsive to a clock pulse and a $2^1$ phase pulse to produce a pulse on the $2^1$ output terminal 136. The fourth "and" gate 138 is responsive to a clock pulse and a $2^1$ phase pulse and the absence of $2^2$ and $2^3$ inhibit pulses to produce, through a second "or" circuit 140, a pulse on the $2^2$ output terminal 142. The fifth "and" gate 144 is responsive to the presence of clock and $2^2$ phase pulses and the absence of $2^1$ and $2^3$ inhibit pulses to produce through the second "or" circuit 140, a pulse on the $2^2$ output terminal 142. The sixth "and" gate 146 is responsive to a clock pulse and the absence of $2^1$, $2^2$ and $2^3$ inhibit pulses to produce, through a third "or" gate 148, a pulse on the $2^3$ output terminal 150. The seventh "and" gate 152 is responsive to the presence of a clock pulse and $2^2$ and $2^3$ phase pulses to produce, through the third "or" circuit 148, a pulse on the $2^3$ output terminal 150.

Figure 4:
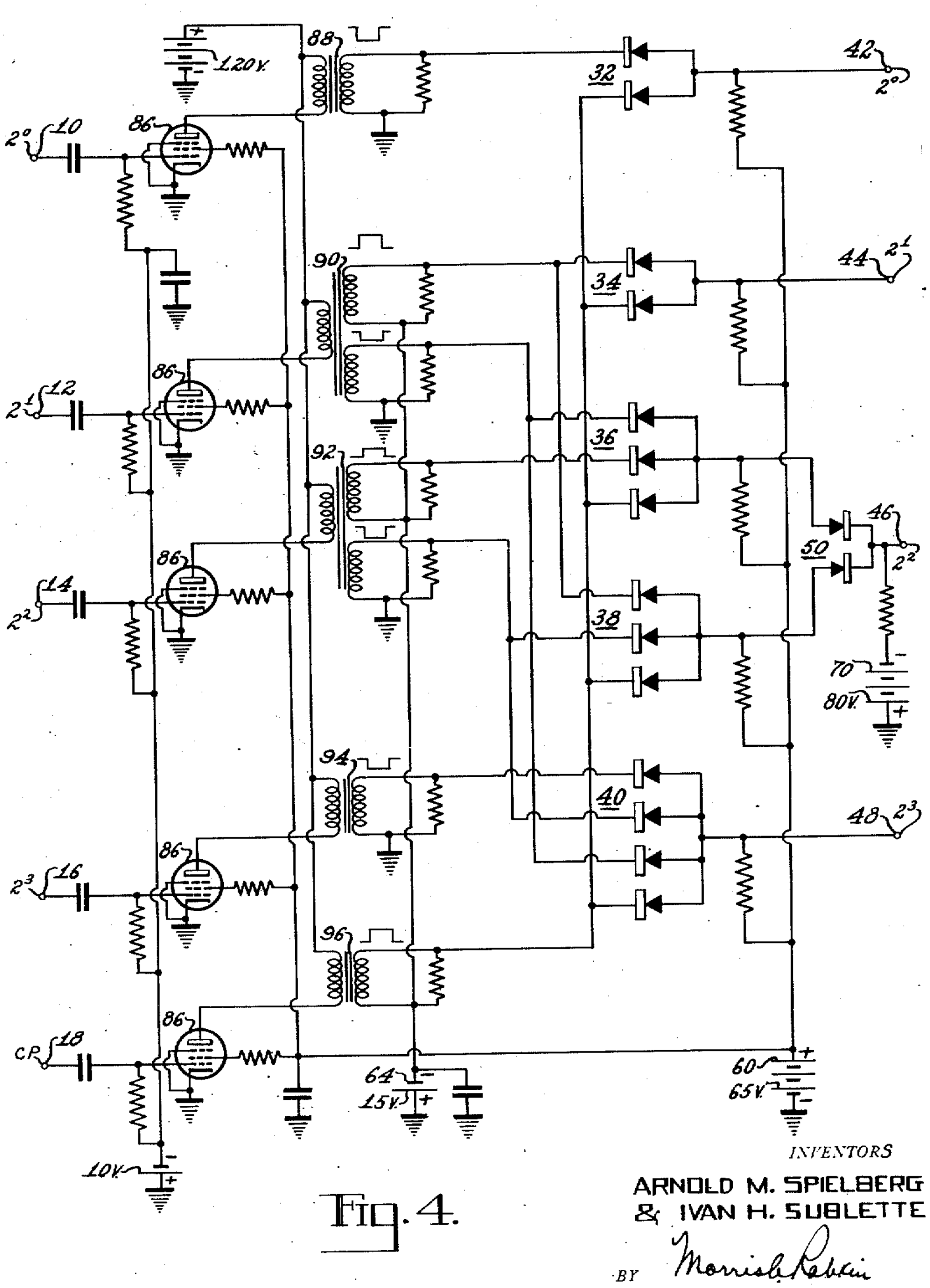
Figure 4 is a schematic circuit diagram of an embodiment of this invention.

The driver circuits and the gating circuits for the embodiment shown in Figure 5 may be the same type as those described with respect to Figure 4. The interconnection and mode of operation of the circuit elements should be readily understood and is substantially the same for both embodiments.

There has been described above a novel system requiring a minimum amount of apparatus for obtaining a relatively fast operating, inexpensive, and efficient conversion of a binary number to its nines complement. The construction, operation and maintenance of apparatus incorporating this system are relatively simple.

What is claimed is:

1. Code apparatus for converting a first plurality of signals representative of a number in a binary code to a second plurality of signals representative of the nines complement of said number, in said binary code, said aparauts comprising a plurality of parallel signal input terminals, each of a first, a second, a third and a fourth of said input terminals corresponding to a different binary digit of said number, means to apply said first signals to said input terminals, means coupled to said input terminals and responsive to said applied signals to generate phase and paraphase voltages, a plurality of parallel signal output terminals, each of a first, a second, a third and a fourth of said output terminals corresponding to a different binary digit of said nines complement, gate circuit means coupled to said output terminals and responsive to different combinations of said phase and paraphase voltages to produce signals on certain of said output terminals representative of the nines complement of said number, and a distribution network coupled between said voltage generating means and said gate circuit means to apply said different combinations of phase and paraphase voltages to said gate circuit means.

2. Code apparatus as recited in claim 1 wherein said phase and paraphase voltages to said gate circuit means, phase voltage corresponding to a signal on said first input terminal to produce a signal on said first output terminal, responsive to the presence of a phase voltage corresponding to a signal on said second input terminal to produce a signal on said second output terminal, responsive to the presence of a phase voltage and the absence of a paraphase voltage corresponding respectively to signals on said second and third input terminals or corresponding respectively to signals on said third and second input terminals to produce a signal on said third output terminal, and responsive to the absence of paraphase voltages corresponding to signals on said second, third, and fourth input terminals to produce a signal on said fourth output terminal.

3. Code apparatus for converting a first plurality of signals representative of a number in a binary code to a second plurality of signals representative of the nines complement of said number, said apparatus comprising a plurality of parallel signal input terminals for receiving said first signals, each of a first, second, third and fourth of said input terminals corresponding to a different binary digit of said number, means coupled to said input terminals and responsive to said first signals to generate phase and paraphase voltages, means to generate time-spaced clock pulses, a first, second, third and fourth parallel signal output terminal each corresponding to a different binary digit of said nines complement, gate circuit means including a plurality of coincidence gate circuits coupled to said output terminals and responsive to different combinations of said phase and paraphase voltages and to said clock pulses to produce signals on certain of said output terminals representative of the nines complement of said number, and a distribution network coupled between said voltage generating means and said coincidence gate circuits to apply said different combinations of phase and paraphase voltages to said coincidence gate circuits.

4. Code apparatus as recited in claim 3 wherein a first one of said coincidence gate circuits is responsive to a clock pulse and to the absence of a paraphase voltage corresponding to a signal on said first input terminal to produce a signal on said first output terminal.

5. Code apparatus as recited in claim 4 wherein a second one of said coincidence gate circuits is responsive to a clock pulse and to the presence of a phase voltage corresponding to a signal on said second input terminal to produce a signal on said second output terminal.

6. Code apparatus as recited in claim 5 wherein a third one of said coincidence gate circuits is responsive to a clock pulse, to the presence of a phase voltage corresponding to a signal on said second input terminal, and to the absence of a paraphase voltage corresponding to a signal on said third input terminal to produce a signal on said third output terminal, a fourth one of said coincidence gate circuits is responsive to a clock pulse, to the presence of a phase voltage corresponding to a signal on said third input terminal, and to the absence of a paraphase voltage corresponding to a signal on said second input terminal to produce a signal on said third output terminal, and said gate circuit means includes a buffer gate circuit coupling said third and fourth coincidence gate circuits to said third output terminal.

7. Code apparatus as recited in claim 6 wherein a fifth one of said coincidence gate circuits is responsive to a clock pulse and to the absence of paraphase voltages corresponding to signals on said second, third and fourth input terminals to produce a signal on said fourth output terminal.

8. Code apparatus as recited in claim 7 wherein a sixth one of said coincidence gate circuits is responsive to a clock pulse and to the absence of paraphase voltages corresponding to signals on said fourth input terminal and on a fifth one of said input terminals to produce a signal on said first output terminal, said gate circuit means includes a buffer gate circuit coupling said first and sixth coincidence gate circuit to said first output terminal, a seventh one of said coincidence gate circuits is responsive to a clock pulse and to the presence of phase voltages corresponding to signals on said third and fourth input terminals to produce a signal on said fourth output terminal, said gate circuit means includes a buffer gate circuit coupling said fifth and seventh coincidence gate circuits to said fourth output terminal, and said third and fourth coincidence gate circuits are further responsive to the absence of a paraphase voltage corresponding to a signal on said fourth input terminal as well as to the presence and absence of said other signals to produce signals on said third output terminal.

9. Code apparatus for converting a first plurality of signals representative of a number in a binary code to a second plurality of signals representative of the nines complement of said number; said apparatus comprising a plurality of parallel signal input terminals for receiving said first signals, each of a first, second, third and fourth of said input terminals corresponding to a different binary digit of said number; means coupled to said input terminals and responsive to said first signals to generate phase and paraphase voltages including a first and fourth transformer coupled respectively to said first and fourth input terminals and each having a secondary coil arranged to produce paraphase voltages, and a second and third transformer coupled respectively to said second and third input terminals and each having secondary coils arranged to produce phase and paraphase voltages; a first, second, third and fourth parallel signal output terminal; and gate circuit means coupled to said output terminals and responsive to different combinations of said phase and paraphase voltages to produce signals on certain of said output terminals representative of the nines complement of said number including a first coincidence gate having a diode coupled between said first transformer secondary and said first first output terminal, a second coincidence gate having a diode coupled between said second transformer phase-voltage secondary and said second output terminal.

10. Code apparatus as recited in claim 9 wherein said gate circuit means further includes a third coincidence gate having one diode coupled to said second transformer phase-voltage secondary and another diode coupled to said third transformer paraphase-voltage secondary, a fourth coincidence gate having one diode coupled to said second transformer paraphase-voltage secondary and another diode coupled to said third transformer phase-voltage secondary, a buffer gate coupling said third and fourth coincidence gate diodes to said third output terminal, a fifth coincidence gate having one diode coupled between said second transformer paraphase-voltage secondary and said fourth output terminal, another diode coupled between said third transformer paraphase-voltage secondary and said fourth output terminal, and still another diode coupled between said fourth transformer secondary and said fourth output terminal.

11. Code apparatus as recited in claim 10 wherein said means to generate phase and paraphase voltages includes a fifth transformer coupled to a fifth one of said input terminals and having a secondary coil arranged to produce paraphase voltages, said fourth transformer has a secondary coil arranged to produce phase voltages; said gate circuit means includes a sixth coincidence gate having one diode coupled to said fourth transformer paraphase-voltage secondary, and another diode coupled to said fifth transformer secondary, a buffer gate coupling said first and sixth coincidence gate diodes to said first output terminal, a seventh coincidence gate having one and another diode respectively coupled to said third and fourth transformer phase-voltage secondaries, and a buffer gate coupling said fifth and seventh coincidence gate diodes to said fourth output terminal; and said third and fourth coincidence gates each further having another diode coupled between said fourth transformer paraphase-voltage secondary and said third output terminal.

References Cited in the file of this patent

UNITED STATES PATENTS

| | | |
|---|---|---|
| 2,428,812 | Rajchman | Oct. 14, 1947 |
| 2,590,950 | Eckert | Apr. 1, 1952 |
| 2,603,716 | Low | July 15, 1952 |
| 2,609,143 | Stibitz | Sept. 2, 1952 |

OTHER REFERENCES

"The Transistor," copyright 1951. Prepared by Bell Telephone Labs, Inc., for Western Electric Co., New York, New York (pp. 533 and 573).

UNITED STATES PATENT OFFICE

CERTIFICATE OF CORRECTION

'atent No. 2,798,667 July 9, 1957

Arnold M. Spielberg et al.

It is hereby certified that error appears in the printed specification f the above numbered patent requiring correction and that the said Letters atent should read as corrected below.

Column 7, lines 55 and 56, for "phase and paraphase voltages to said ate circuit means, phase voltage corresponding to a signal on said first n-" read -- gate circuit means is responsive to the absence of a paraphase oltage corresponding to a signal on said first in- --.

Signed and sealed this 1st day of October 1957.

SEAL)

ttest:

RL H. AXLINE

;testing Officer

ROBERT C. WATSON

Commissioner of Patents